US012534641B2

(12) United States Patent
Pintar et al.

(10) Patent No.: US 12,534,641 B2
(45) Date of Patent: Jan. 27, 2026

(54) PROCESS FOR MAKING PRESSURE SENSITIVE ADHESIVE HYDROGELS

(71) Applicant: Solventum Intellectual Properties Company, Maplewood, MN (US)

(72) Inventors: Kathryn A. Pintar, Minneapolis, MN (US); Vinod P. Menon, Woodbury, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 1097 days.

(21) Appl. No.: 17/600,060

(22) PCT Filed: Mar. 19, 2020

(86) PCT No.: PCT/IB2020/052551
§ 371 (c)(1),
(2) Date: Sep. 29, 2021

(87) PCT Pub. No.: WO2020/201878
PCT Pub. Date: Oct. 8, 2020

(65) Prior Publication Data
US 2022/0154041 A1    May 19, 2022

Related U.S. Application Data

(60) Provisional application No. 62/827,329, filed on Apr. 1, 2019.

(51) Int. Cl.
| | | |
|---|---|---|
| C09J 4/00 | (2006.01) |
| A61B 5/266 | (2021.01) |
| C08F 2/38 | (2006.01) |
| C08F 2/48 | (2006.01) |
| C08F 222/04 | (2006.01) |
| C08F 222/10 | (2006.01) |
| C09J 135/02 | (2006.01) |

(52) U.S. Cl.
CPC ............ C09J 4/00 (2013.01); A61B 5/266 (2021.01); C08F 2/38 (2013.01); C08F 2/48 (2013.01); C08F 222/04 (2013.01); C08F 222/102 (2020.02); C09J 135/02 (2013.01)

(58) Field of Classification Search
CPC ........ C09J 4/00; C09J 135/02; C08F 222/102; C08F 222/04; C08F 2/48; C08F 2/38; A61B 5/266
See application file for complete search history.

(56) References Cited

U.S. PATENT DOCUMENTS

| | | |
|---|---|---|
| 3,645,835 A | 2/1972 | Hodgson |
| 3,805,769 A | 4/1974 | Sessions |
| 3,845,757 A | 11/1974 | Weyer |
| 4,310,509 A | 1/1982 | Berglund |
| 4,527,087 A | 7/1985 | Taya |
| 4,539,996 A | 9/1985 | Engel |
| 4,554,924 A | 11/1985 | Engel |
| 4,593,081 A * | 6/1986 | Bobsein ................. C08F 20/12 526/214 |
| 4,595,001 A | 6/1986 | Potter |
| 4,640,289 A | 2/1987 | Craighead |
| 4,715,382 A | 12/1987 | Strand |
| 4,771,783 A | 9/1988 | Roberts |
| 4,846,185 A | 7/1989 | Carim |
| 4,848,353 A | 7/1989 | Engel |
| 4,849,224 A | 7/1989 | Chang |
| 4,855,294 A | 8/1989 | Patel |
| 5,012,810 A | 5/1991 | Strand |
| 5,133,356 A | 7/1992 | Bryan |
| 5,215,087 A | 6/1993 | Anderson |
| 5,270,358 A | 12/1993 | Asmus |
| 5,660,178 A | 8/1997 | Kantner |
| 6,232,366 B1 * | 5/2001 | Wang ..................... C09J 133/02 428/41.5 |
| 7,629,411 B2 | 12/2009 | Becker |
| 7,999,023 B2 | 8/2011 | Menon |
| 2003/0203011 A1 | 10/2003 | Abuelyaman |
| 2005/0192370 A1 | 9/2005 | Fansler |
| 2007/0032719 A1 | 2/2007 | Menon |
| 2018/0355220 A1* | 12/2018 | Beschmann ........... C09J 133/10 |

FOREIGN PATENT DOCUMENTS

| | | | |
|---|---|---|---|
| WO | WO 1989-007951 | 9/1989 | |
| WO | WO-2017042003 A1 * | 3/2017 | ................ C08F 2/48 |

OTHER PUBLICATIONS

International Search Report for PCT International Application No. PCT/IB2020/052551, mailed on May 29, 2020, 4 pages.
OECD Guidelines for the Testing of Chemicals, Section 1, Test No. 105: Water Solubility, Jul. 1995, 7 pages.

* cited by examiner

Primary Examiner — Patrick D Niland

(57) ABSTRACT

A process is disclosed for preparing a pressure sensitive adhesive hydrogel. The process (A) provides an oligomeric precursor, the oligomeric precursor comprising a polyether moiety endcapped with ethylenic unsaturation, the oligomeric precursor being associated with methacrylic acid; (B) provides an ethylenically unsaturated crosslinking agent selected from the group consisting of difunctional ethylenically unsaturated monomer, difunctional ethylenically unsaturated monomer and combinations of the foregoing; (C) provides a thiol; and (D) free radically curing a mixture of the oligomeric precursor, the ethylenically unsaturated crosslinking agent, and the thiol in water in the presence of the methacrylic acid at a pH between about 3.5 and about 9 to provide the pressure sensitive adhesive hydrogel.

20 Claims, 2 Drawing Sheets

PROCESS FOR MAKING PRESSURE SENSITIVE ADHESIVE HYDROGELS

CROSS REFERENCE TO RELATED APPLICATIONS

This application is a national stage filing under 35 U.S.C. 371 of PCT/IB2020/052551, filed Mar. 19, 2020, which claims the benefit of Provisional Application No. 62/827,329, filed Apr. 1, 2019, the disclosures of each of which are incorporated by reference herein in their entireties.

This invention relates to a process for the manufacture of pressure sensitive adhesive hydrogel materials and to methods for the manufacture of medical articles with such pressure sensitive adhesive hydrogels.

BACKGROUND

Water swelling pressure sensitive adhesives based on polyethylene oxide (PEO) are useful in a variety of articles including medical articles. The use of such materials in medical articles includes wound dressings, wound packings, contact lenses, intraocular lenses, adhesives for biological tissues, adhesion preventing materials, adsorbents for blood purification, base materials for releasing pharmacologic agents, biomedical electrodes, and the like. Materials used in dentistry may also incorporate such pressure sensitive adhesives for dental moldings or impressions, dental adhesives, restoratives, coatings, composites, sealants and the like. As used herein, "medical" applications are intended to encompass dental applications, including dental adhesives, restoratives, coatings, composites, sealants, etc. Water swelling polymer gels have compositions and mechanical properties similar to those of biological tissues.

A common method for imparting a desired balance (tack) between cohesiveness and adhesion in pressure sensitive adhesive materials has been by the use of high-energy radiation (e.g., ultraviolet) to assist in randomly crosslinking the PEO to a predetermined cross-link density. An alternate method involves the free radical cure of a PEO-based precursor end capped with ethylenic unsaturation. This alternate method utilizes a procedure for building the molecular weight of the precursor to a desired level from low molecular weight polyethylene glycol diamines and diisocyanates through multiple condensation reactions and end capping with ethylenically unsaturated moieties. While effective, this alternate method requires precise control of the chain extension reactions which can be labor-intensive and time-consuming.

In the preparation of the foregoing precursors, PEO material of a desired molecular weight is first endcapped with reactive ethylenic unsaturation. Suitable end groups might include any of a variety of materials. Methacrylate end groups may be desired where the final adhesive material is to be used in medical applications. Methacrylates are generally easy to make and have a low potential to cause skin irritation.

It is desirable to provide adhesive materials, such as pressure sensitive adhesive hydrogels, from oligomeric precursors end capped with ethylenic unsaturation. It is also desirable to provide the foregoing adhesive materials in a more efficient and cost-effective manner than has previously been provided in the art. It is desirable to provide the foregoing oligomeric precursor as a polyether moiety endcapped with ethylenic unsaturation and to further provide the foregoing adhesive hydrogels for use in medical applications, if desired.

SUMMARY

The present disclosure provides a process for preparing a pressure sensitive adhesive hydrogel, comprising:
(A) providing an oligomeric precursor, the oligomeric precursor comprising a polyether moiety endcapped with ethylenic unsaturation, the oligomeric precursor being associated with methacrylic acid;
(B) providing an ethylenically unsaturated crosslinking agent selected from the group consisting of difunctional ethylenically unsaturated monomer, trifunctional ethylenically unsaturated monomer and combinations of the foregoing;
(C) providing a thiol; and
(D) free radically curing a mixture of the oligomeric precursor, the ethylenically unsaturated crosslinking agent, and the thiol in water in the presence of the methacrylic acid and the thiol at a pH between about 3.5 and about 9 to provide the pressure sensitive adhesive hydrogel.

The present disclosure also provides a pressure sensitive adhesive hydrogel, comprising a free radical reaction product of a mixture in water in the presence of methacrylic acid at a pH between about 3.5 and about 9, the mixture comprising:
(A) an oligomeric precursor comprising a polyether moiety endcapped with ethylenic unsaturation, the oligomeric precursor being associated with the methacrylic acid;
(B) an ethylenically unsaturated crosslinking agent selected from the group consisting of difunctional ethylenically unsaturated monomer, trifunctional ethylenically unsaturated monomer and combinations of the foregoing; and
(C) a thiol.

"Gel" or "hydrogel" means a gel material comprising a colloid, dispersion, suspension or the like in which the particles (e.g., polymer particles) are in the external or dispersion phase and water is the dispersed phase. Gels or hydrogels may exist in varying states of hydration and are typically capable of swelling, without dissolving, when contacted with water or water-based fluids (e.g., body fluids including blood, plasma, and intracellular fluid or fluids similar to body fluids such as physiological saline).

"Thiol" refers to an organosulfur compound having an —SH functional group. Thiols can also be called "mercaptans".

The phrase "associated with methacrylic acid" refers to the presence of methacrylic acid. In the context of the described embodiments, the methacrylic acid is typically associated with the oligomeric precursor as a by product of the reaction to provide the precursor as a polyether moiety endcapped with ethylenic unsaturation. In some embodiments, for example, polyethylene glycol is reacted with methacrylic anhydride. While methacrylic anhydride reacts to provide ethylenically unsaturated end groups on the polyether, any unreacted anhydride can be hydrolyzed to provide a residual concentration of methacrylic acid which remains associated with the oligomeric precursor. However, the foregoing phrase also encompasses methacrylic acid that has been added to the oligomeric precursor, for example.

Those skilled in the art will further understand the details of the present disclosure upon a review of the remainder of

BRIEF DESCRIPTION OF THE DRAWINGS

In describing the embodiments of the disclosure, reference is made to the various drawings wherein like reference numerals indicate structures and wherein.

DETAILED DESCRIPTION

Figure 1:
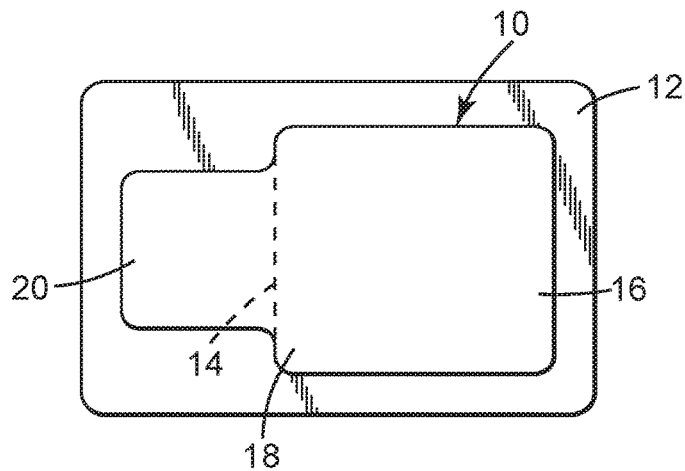
FIG. 1 is a top plan view of a biomedical electrode containing hydrophilic pressure sensitive adhesive of the present disclosure.

The present disclosure provides a process for making pressure sensitive adhesive hydrogels derived from an aqueous solution of an oligomeric precursor comprising the reaction product of polyether moiety, an ethylenically unsaturated moiety, and a thiol. Methacrylic anhydride is used in the inventive process to provide ethylenic unsaturation on an oligomeric precursor. Any unreacted anhydride typically results in the production of methacrylic acid as a by product that can be associated with the oligomeric precursor at levels of up to a few thousand ppm. Methacrylic acid can be a significant irritant if included in an adhesive formulation for use with medical articles and the like. Moreover, the presence of methacrylic acid can hinder the free radical polymerization of the adhesive hydrogel. Removal of the acid from the reaction product has, in the past, required the use of an ultrahigh (e.g., 10 microns Hg) vacuum, thus adding significant expense to the process but still leaving at least some of the methacrylic acid associated with the oligomeric precursor. The process recognizes the potentially deleterious effect of methacrylic acid on the polymerization of the oligomeric precursor to provide a pressure sensitive adhesive hydrogel. The disclosure provides a process that includes a curing step for curing the oligomeric precursor in the presence of methacrylic acid in water by controlling the pH of the solution during cure. The disclosure also provides processes for the manufacture of medical articles. The process of the disclosure facilitates the curing of oligomeric precursor with a crosslinker and a thiol in the presence of water and residual methacrylic acid by free radical polymerization. In some embodiments, the free radical polymerization is accomplished using ultraviolet light to initiate the polymerization reaction. The hydrogel obtained by the inventive process is useful as a pressure sensitive biomedical adhesive which can be formulated to transmit/receive electrical signals when used as a component of a biomedical electrode. The adhesive hydrogel may also be used as a drug delivery device to deliver pharmaceuticals or other active ingredients to or through mammalian skin. The adhesive hydrogel may also be useful as a component in a skin covering for protecting mammalian skin or mammalian skin openings with antimicrobial agents. The disclosure provides a process for the manufacture of a hydrophilic, pressure sensitive adhesive hydrogel made from a water-soluble polyether derived network plasticized with an essentially non-volatile plasticizer present in an amount sufficient to form a cohesive, pressure sensitive adhesive hydrogel. The process of the disclosure exhibits a surprising dependence on pH during polymerization (or cure).

The hydrogel material of the present disclosure can be used in medical articles. In some embodiments, the gel material is absorbent, and may be advantageously transparent where inspection of an underlying material or medical condition may be desired. For medical articles such as wound dressings, transparency may permit the visual inspection of the wound without the need to first remove the wound dressing. In some embodiments, the gel material will be both absorbent and transparent.

Medical articles, particularly wound dressings, made according to the process of the disclosure are typically capable of removing excess exudate from the wound, maintaining a moist wound environment; allowing gas exchange so that oxygen, water vapor, and carbon dioxide can pass through the article; are thermally insulating to maintain the wound at body temperature; may be impermeable to liquids and microorganisms to minimize contamination and infection; and may be non-adherent to the wound so that no damage is done to the granulating tissue.

A hydrogel made according to the process of the present disclosure may be absorbent in that it is capable of absorbing fluids such as moderate to heavy amounts of various fluids (e.g., body fluids) while retaining the structural integrity and typically the transparency of the hydrogel. The hydrogel made according to the disclosure is "absorbent" in that it typically can absorb at least its own weight of an isotonic saline solution (0.9 weight percent sodium chloride in deionized water) after 24 hours at room temperature. That is, the material has an absorbency of at least 100 weight percent. More preferably, the gel material can absorb at least two times its weight (200 weight percent absorbency), even more preferably at least four times its weight (400 weight percent absorbency), and most preferably at least five times its weight (500 weight percent absorbency) of an isotonic saline solution after 24 hours at room temperature. Typically, gel material of the present disclosure can absorb up to eight times its weight of an isotonic saline solution.

In some embodiments, hydrogel materials made according to the process of the disclosure are relatively flexible. Flexibility allows for a medical article incorporating the hydrogel material to be easily applied to a bendable portion of a body, such as a joint, etc. Nonflexible materials may also be made according to the disclosure and may be used as wound packing materials, for example.

The hydrogel material made according to the process of the present disclosure is typically biocompatible in that the hydrogel has the ability to contact body tissues and/or body fluids without significant adverse reactions.

As mentioned, the hydrogel materials made according to the present disclosure possess pressure sensitive adhesive properties, and the pressure sensitive adhesive hydrogels made according to the disclosure typically comprise crosslinked polymers resulting from polymerization of oligomeric precursor and crosslinking agent wherein the oligomeric precursor is a polyether endcapped with ethylenic unsaturation. In some embodiments, the oligomeric precursor is a polyether methacrylate which, when reacted with a suitable crosslinking agent, provides a pressure sensitive adhesive hydrogel polymer exhibiting a glass transition temperature of less than −15° C.

In some embodiments, the pressure sensitive adhesive hydrogels made according to the present disclosure are bacteriostatic and possess low odor. Bacteriostatic and/or low odor properties can be inherent. In some embodiments, bacteriostatic agents and odor removing agents can be added to enhance these properties in the hydrogel material. Such materials are described in greater detail below.

The hydrogel material made according to the present disclosure comprises a polymer of a multifunctional poly (alkylene oxide) free-radically polymerizable oligomer (e.g., an oligomeric precursor). In some embodiments, the multifunctional poly(alkylene oxide) oligomer has a weight average molecular weight of at least about 6000. Oligomers with molecular weights lower than this may be undesirably brittle. In some embodiments, the multifunctional oligomer can have a weight average molecular weight of at least about 8000, and often at least about 12,000. Materials made according to the disclosure can have significantly higher molecular weights as well. In general, the multifunctional oligomer will have a molecular weight that provides an oligomer in a flowable and processable state at room temperature (e.g., in a liquid state). However, high molecular weight multifunctional oligomers that are not flowable at room temperature can be used if they can be processed using diluents or other additives and/or higher temperatures (e.g., extrusion temperatures). The multifunctionality of the oligomer leads to crosslinking upon polymerization. Typically, the higher the molecular weight of the multifunctional poly(alkylene oxide) oligomer, the greater the resulting distance between crosslinks in the final gel material (i.e., the lower the crosslink density). In some embodiments, a lower crosslink density will also provide desirable mechanical properties with a desirable balance of compliance (i.e., elasticity) and tensile strength as well as cohesive strength in the swollen form.

In some embodiments, pressure sensitive adhesive hydrogels made according to the process of the present disclosure are first prepared by exposing to a source of free radicals a difunctional polyether moiety endcapped with ethylenic unsaturation. Suitable polyether moieties may be derived from poly(ethylene glycol), for example, while ethylenic unsaturation may be provided with end groups comprising methacrylate to provide, at least in part, an oligomeric precursor comprising polyethylene glycol dimethacrylate. Other suitable polyether moieties include poly[ethylene glycol co-propylene glycol] random copolymer, for example. In embodiments where polyethylene glycol dimethacrylate is the multifunctional oligomer in the process of the disclosure, the oligomeric precursor may be prepared according to the process described, for example, in U.S. patent application 2003/0203011, the entire disclosure of which is incorporated herein by reference thereto. Briefly, a suitable oligomeric precursor may be obtained via the reaction of polyethylene glycol and methacrylic anhydride in the presence of antioxidant such as 2,6-di-tert-butyl-4-methylphenol ("BHT") and in the absence of water or other solvent. The reaction results in a water soluble oligomeric precursor which also comprises residual methacrylic acid as a by product. At least a portion of the acid may optionally be removed from the oligomeric precursor reaction product by vacuum stripping. The water soluble multifunctional oligomer or oligomeric precursor and methacrylic acid by-product is next dissolved in water or a water based solvent to provide an oligomeric precursor solution to which additional reactants and other components may be added. Residual methacrylic acid levels in the oligomeric precursor solution may range from a few ppm to greater than about 100 ppm and up to several hundred or several thousand ppm. In some embodiments, residual methacrylic acid levels in the oligomeric precursor solution may range from about 100 ppm up to about 500 ppm.

A crosslinking agent can be added to the polymer precursor solution to provide a reactive solution. The crosslinking agent facilitates crosslinking during chain propagation of the polymer upon exposure to the proper conditions for cure. The crosslinking agent is water soluble and, in some embodiments, is a difunctional crosslinking agent. In some embodiments, the crosslinking agent is a trifunctional crosslinking agent. Mixtures of difunctional and trifunctional crosslinking agents can be used. Suitable difunctional crosslinking agents can include one or more of the following: polyethylene glycol di(meth)acrylate, methylene bis (meth)acrylamide, ethoxylated bisphenol A di(meth)acrylate, and alkanediol di(meth)acrylate. Suitable trifunctional crosslinking agents can include one or more of the following: ethoxylated trimethylolpropane tri(meth)acrylate, trimethylol propane tri(meth)acrylate, ethoxylated glyceryl tri (meth)acrylate, and propoxylated glyceryltri(meth)acrylate. Those skilled in the art will recognize that other crosslinking agents may be used successfully in the process of the disclosure.

In some embodiments, the crosslinking agent used in the process of the disclosure may first be dissolved in water to provide a solution of the unreacted crosslinking agent. Thereafter, the solution of crosslinking agent may be combined with the solution of oligomeric precursor to provide a reactive solution comprising the multifunctional oligomer, crosslinking agent and additional components, including the thiol, as described herein. In some embodiments of the disclosure, the crosslinking agent may be dissolved in water by adding it directly to the oligomeric precursor solution without first forming a solution of the crosslinking agent to thereby provide a reactive solution. The thiol component can be added to a solution of the unreacted crosslinking agent, or added to a solution of the oligomeric precursor, or added to a solution of both the unreacted crosslinking agent and the oligomeric precursor, to provide the reactive solution.

In some embodiments, free radically curing the mixture of the oligomeric precursor, the ethylenically unsaturated crosslinking agent, and the thiol includes dissolving the oligomeric precursor and the ethylenically unsaturated crosslinking agent in separate volumes of water to provide an oligomeric precursor solution and an ethylenically unsaturated monomer solution, and combining the oligomeric precursor solution and the ethylenically unsaturated monomer solution to provide a reactive solution; addition of the thiol can be according to any of the following:

(a) the thiol is added to either of the separate volumes of water; or (b) the thiol is added to both of the separate volumes of water; or (c) the thiol is added directly to the reactive solution.

An ultraviolet initiator material is then added to the reactive solution, and the reactive solution is exposed to ultraviolet radiation to initiate a polymerization reaction and thereby provide the pressure sensitive adhesive hydrogel.

The process of the disclosure is not intended to be limited by the manner in which the crosslinking agent, the thiol, and the oligomeric precursor are mixed together to provide an aqueous reactive solution.

The amount of oligomeric precursor in the reactive solution will typically range from about 4 to 60 weight percent of the reactive solution. In some embodiments, the amount of oligomeric precursor in the reactive solution will range from about 15 to 25 weight percent of the reactive solution. The crosslinking agent is typically present at a concentration ranging from about 0.5% to about 20%.

A thiol is included in the process of the present disclosure for making pressure sensitive hydrogels. It has been surprisingly found that addition of a thiol to a pressure sensitive hydrogel formulation of the present disclosure improves adhesion. In some embodiments, the addition of a thiol does not compromise cohesion in the pressure sensitive hydrogel. In some embodiments, the addition of a thiol is not accompanied by alteration of polymer content in the pressure sensitive hydrogel.

Without being bound by theory, the thiol potentially acts as a chain transfer agent or potentially provides endcapping of (meth)acrylates, for example, through a Michael addition.

The thiol of the present disclosure is of the formula $R_1$—SH, where $R_1$ can be alkyl or aryl. Some useful alkyl thiols can be linear alkyl thiols (that is, straight chain allyl thiols) or branched, and can be substituted with functional groups. Useful linear alkyl thiols can include those of the formula $HS(CH_2)_nX$, wherein n is the number of methylene units and X is the end group of the alkyl chain (for example, X=—$CH_3$, —OH, —COOH, —$COOR_2$ (wherein $R_2$ is alkyl or aryl), —$NH_2$, or the like). A typical useful range for n is from about 2 to about 10. Some examples of optional mid-chain substituents within useful alkyl thiols can include ether groups and aromatic rings.

Some useful aryl thiols can include aryl rings having a thiol substituent on the aryl ring. The aryl ring can be additionally substituted with a range of substituents, including substituted alkyl groups, substituted aryl groups, or functional groups (for example, —OH, —COOH, —$COOR_2$ (wherein $R_2$ is alkyl or aryl), —$NH_2$, or the like), or combinations of substituents. The substituents can be at any of a variety of locations on the aryl ring.

Some esters of thioacetic acid (also called thioglycolates) having the formula $HSCH2COOR_2$ (wherein $R_2$ is alkyl or aryl) can also be used as the thiol. Similarly, some esters of 2-mercaptopropionic acid or 3-mercaptopropionic acid can also be useful.

Thiol compounds having acidic or basic group can also be used as their various salt forms, for example, cysteine hydrochloride salt, or sodium salts of the thiol compounds including a carboxylic acid group.

Other thiols that can be used include dithio compounds of the general formula HS—(Z)—SH, where (Z) is an alkyl or aryl group (according the above listings for $R_1$). Non-limiting examples of dithio compounds include dithioerythritol, 1,4-dithiothreitol, 2,3-dithiosuccinic acid and its derivatives, and the like.

Latent thiol compounds can be considered, for example, disulfide compounds such as cystine and glutathione disulfide, which are potentially converted to thiol compounds by various reactions including those promoted by ultraviolet light. The cyclic compound 2,5-dihydroxy-1,4-dithiane, the dimer and potential source of 2-mercaptoacetaldyde, can also be considered.

In some embodiments, the thiol has a water solubility of at least 4 mg/L, at least 10 mg/L, at least 100 mg/L, at least 500 mg/L, or even at least 1000 mg/L. In some embodiments, the thiol is miscible with water at any concentration. Water solubility can be determined, for example according to the "OECD Guidelines for the Testing of Chemicals, Section 1, Test No. 105: Water Solubility (adopted Jul. 27, 1995)".

In some embodiments, the amount of thiol included with the oligomeric precursor and ethylenically unsaturated crosslinking agent for the curing step is in a range from 100 ppm to 10,000 ppm, in a range from 300 ppm to 7000 ppm, or even in a range from 500 ppm to 5000 ppm. However, too much thiol could interfere with overall crosslinking density, to the point of losing structural integrity.

In some embodiments, the molecular weight of the thiol is not particularly limited, and can include a wide range of molecular weights. For example, 2-mercaptoethanol has a molecular weight of 78 g/mol, whereas some poly(ethylene glycol) methyl ether thiols (available from Sigma-Aldrich, St. Louis, Mo.) have number average molecular weights ($M_n$) of 800 g/mol, 2,000 g/mol, or even 6,000 g/mol. In some embodiments, the molecular weight of the thiol can be within a range from 77 g/mol to about 400 g/mol.

Non-limiting examples of suitable thiols include 2-mercaptoethanol, cysteine, isooctylthioglycolate. Some additional suitable water soluble thiols are N-acetyl-1-cysteine, N-2-mercaptoethyl)acetamide, glutathione, N-(2-mercaptopropionyl)glycine, penicillamine, benzenethiol, dithioerythritol, thioacetic acid, dimercaptosuccinic acid, 3-mercaptopropane-1,2-diol, 3-mercapto-1-propanesulfonic acid, and furan-2-ylmethanethiol.

The thiols listed above preferably do not interfere with the formation of a pressure sensitive, hydrogel of the present disclosure.

A non-volatile polar plasticizer is typically present in the reactive solution in an amount ranging from about 96 to 20 weight percent prior to polymerization. In some embodiments, a non-volatile polar plasticizer is present in the reactive solution in an amount ranging from about 50 to 40 weight percent prior to polymerization. The plasticizer serves to minimize the crystallization of the polyether moiety of the polymeric network at ambient and mammalian body temperatures, increase the compliance of the polymeric network to give pressure sensitive adhesive properties and conformability to mammalian bodies and other curved surfaces, and modify the tack or thumb appeal of the pressure sensitive adhesive. The plasticizer can also serve as a solvent to dissolve other additives including initiators, electrolytes, and pharmacologically active components. The plasticizer is essentially non-volatile because using water alone as the plasticizer for the multifunctional oligomer will often yield materials with poor to moderate tack which are prone to rapid loss of moisture. In some embodiments, non-volatile, polar plasticizers comprise hydroxy-containing plasticizers miscible with both water and the oligomeric precursor, such plasticizers including those selected from alcohols, mixtures of alcohols, and mixtures of water and alcohols such that the mixture of alcohol, water, and oligomeric precursor is liquid in the uncured state and displays pressure sensitive tack once polymerized. Typically, the alcohol should have low volatility and should not greatly interfere with the subsequent polymerization of the oligomeric precursor.

Non-limiting examples of suitable alcohols include glycerin, propylene glycol, dipropylene glycol, sorbitol, 1,3-butanediol, 1,4-butanediol, and trimethylol propane, for example. In some embodiments, suitable alcohols include ethylene glycol and derivatives given by Formula I:

$$MO(CH_2CH_2O)_mH \qquad \qquad I$$

wherein

M is hydrogen or $C_1$ through $C_6$ alkyl; and m is an integer ranging from about 1 to about 25.

Suitable materials for use as polar plasticizers include, for example, polyethylene glycol having a molecular weight (weight average) of 300, such as is commercially available under the trade designation "CARBOWAX PEG 300" from Dow Chemicals, Midland Mich. In some embodiments, the non-volatile, polar plasticizer is a mixture of 300 or 400 molecular weight (weight average) polyethylene glycol.

In applications where the final hydrogel is to be used as a conductive adhesive in a biomedical electrode, for example, the reactive solution also will comprise an ionically-conductive electrolyte. Non-limiting examples of electrolyte include ionic salts dissolved in the adhesive to provide ionic conductivity and can include magnesium acetate, magnesium sulfate, sodium acetate, sodium chloride, lithium chloride, lithium perchlorate, sodium citrate, potassium chloride and combinations of the foregoing to enhance ionic conductivity of the pressure sensitive adhesive hydrogel. Alternatively, a redox couple such as a mixture of ferric and ferrous salts such as sulfates and gluconates can be added. The amounts of these ionic salts present in hydrogels made according to the present disclosure are relatively small, from about 0.5 to 10 percent by weight of the hydrogel, and preferably about 2 to 5 weight percent. When a redox couple is used, the biomedical electrode can recover from an overload potential. U.S. Pat. No. 4,846,185 (Carim) discloses a redox couple totaling not more than about 20 percent by weight of the adhesive.

In situ, solventless, polymerization or curing of the oligomeric precursor in the presence of the plasticizer is accomplished by exposing it to a source of free radicals. As one skilled in the art will recognize, free radicals may be generated by thermal, redox, or photochemical means or by exposure of the material to a source of actinic radiation. Curing of the reactive solution comprises chain propagation of the multifunctional oligomer along with or followed by reaction of the polymer chain with crosslinking agent to provide a crosslinked hydrogel.

In some embodiments, curing is accomplished by exposure of the reactive solution to conditions suitable for the generation of free radicals to initiate chain propagation of the desired polymer. When visible or ultraviolet light is used to initiate curing, suitable light sources to effect this cure include medium pressure mercury lamps and low intensity "black light" fluorescent bulbs. Suitable equipment for ultraviolet curing includes equipment such as is described in the examples herein. In the absence of an initiator in the reactive solution, exposure to actinic radiation such as electron beam irradiation or a cobalt 60 gamma source will also generate free radicals. The multifunctionality of the oligomeric precursor leads to crosslinking upon polymerization of ethylenically unsaturated moieties. Typically, the higher the molecular weight of the oligomeric precursor, the greater the distance between crosslinks (i.e., the lower the crosslink density) in the cured polymer. Such lower crosslink density typically provides hydrogels with more desirable mechanical properties. That is, the adhesive hydrogels made according to the present disclosure possess a balance of compliance (i.e., elasticity) and tensile strength as well as cohesive strength in the swollen form.

For free radical polymerization, a suitable initiator material is typically added to the aqueous reactive solution to initiate the polymerization reaction to form a crosslinked hydrogel according to the present disclosure. Typically, the initiator used in the process of the disclosure is one which generates a free radical upon exposure to radiation such as ultraviolet radiation. Suitable initiators include any of the following: benzoin ethers, benzophenone (e.g., 4-(2-hydroxyethoxy) benzophenone and derivatives thereof), acyl phosphine oxides, acetophenone derivatives, camphorquinone, photoinitiators available under the trade designations IRGA-CURE and DAROCUR (Ciba Speciality Chemical Corp., Tarrytown, N.Y.) such as 1-hydroxy cyclohexyl phenyl ketone (IRGACURE 184), 2,2-dimethoxy-1,2-diphenylethan-1-one (IRGACURE 651), bis(2,4,6-trimethylbenzoyl) phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), and 2-hydroxy-2-methyl-1-phenyl propan-1-one (DAROCUR 1173) as well as any photoinitiator with a reactive nucleophilic group. Combinations of two or more of the foregoing initiators may also be used. The initiator is generally present at a concentration of from about 0.05% to about 5% by weight of the reactive solution.

In embodiments utilizing thermal initiation, suitable thermal initiators may include azo compounds, peroxides, and persulfates and when the latter two groups are used in combination with a reducing agent such ascorbic acid or a bisulfite compound and optionally, a catalytic amount of a transition metal salt such as iron or copper, redox generation of radicals may occur even at sub-ambient temperatures.

Various other materials and additives may also be incorporated into the reactive solution for altering properties of the resulting pressure sensitive adhesive hydrogel. Non-limiting examples include low levels of copolymerizable vinyl monomers and non-functionalized compatible polymers. Low levels of copolymerizable vinyl monomers, particularly those miscible in the oligomeric precursor/plasticizer mixture, can serve to accelerate the rate of polymerization. Preferred copolymerizable monomers include acrylic acid and methacrylic acid and their ammonium and alkali metal salts, N-vinyl pyrrolidone, acrylamide, 2-acrylamido-2-methyl propane sulfonic acid and its ammonium and alkali metal salts, hydroxyethyl acrylate, hydroxyethyl methacrylate, 2-ethoxyethyl acrylate, 2-ethoxyethyl methacrylate, and 2-(2-ethoxyethoxy)ethyl acrylate. When utilized, the amount of copolymerizable vinyl monomer preferably comprises from about 2 to about 15 weight percent of the total weight of resulting pressure sensitive adhesive hydrogel.

Addition of non-functionalized compatible polymers can enhance the viscosity of the oligomeric precursor prior to polymerization to impart better coatability for, for example, pattern coating of the resulting hydrophilic pressure sensitive adhesive hydrogel. Suitable polymers include those that are hydrophilic and compatible in the reactive solution including moderate and high molecular weight poly(ethylene oxide), poly(acrylic acid), poly(N-vinyl pyrrolidone), poly(vinyl alcohol), and poly(acrylamide). Optionally, the hydrogel material made according to the present disclosure can include hydrocolloids, typically in the form of particles, although they are not necessarily preferred since they can diminish the transparency of the gel material. Examples of hydrocolloids include, but are not limited to, natural gums, such as plant exudates (gum arabic, ghatti, karaya, and tragacanth), plant seed gums (guar, locust bean and acacia), seaweed extracts (agar, algin, alginate salts and carrageenin), cereal gums (starches and modified starches), fermentation or microbial gums (dextran and xanthan gum), modified celluloses (hydroxymethylcellulose, microcrystalline cellulose and carboxymethylcellulose), pectin, gelatin, casein and synthetic gums (polyvinylpyrrolidone, low methoxyl pectin, propyleneglycol alginates, carboxymethyl locust bean gum and carboxymethyl guar gum) and like water-swellable or hydratable hydrocolloids. The term hydrocolloid is used regardless of the state of hydration. The hydrogel material made according to the present disclosure can include an amount of the hydrocolloid such that the material is transparent (preferably, the total light transmittance is greater than 84% per ASTM D1003-00). Typically, the amount of hydrocolloid, when present, is less than about 5 weight percent, based on the total weight of the hydrogel material.

A suitable peroxide scavenger may be added to the reactive solution to scavenge peroxides formed from the oxidation of polyethylene glycol. Suitable scavengers include thiodipropionic acid (a thioether compound), and its fatty acid esters, for example.

It has surprisingly been found that controlling the pH of the reactive solution during polymerization facilitates the creation of a suitable pressure sensitive adhesive hydrogel even in the presence of the aforementioned methacrylic acid by-product. In contrast, a failure to maintain the pH of the reactive solution in the presence of methacrylic acid will typically result in a failure of the polymerization reaction. While the art has generally recommended that methacrylate solutions be stored at an acidic pH less than 5 to prevent the hydrolysis of ester linkages, it has been discovered that the curing of the oligomeric precursor and crosslinking agent in the presence of methacrylic acid impurity is facilitated by maintaining the pH of the reactant solution within certain ranges. Adjustments to the pH of the reactive solution may be accomplished using a suitable acid, base or buffer.

Prior to initiating polymerization or curing, the pH of the reactive solution may be adjusted, if necessary. The present disclosure comprises maintaining the reactive solution is within a desired pH range during polymerization. Typically, the pH of the reactive solution is maintained at a pH above or equal to about 3.5 and below or equal to about 9. In some embodiments, the pH of the reactive solution is maintained above or equal to about 5 and below or equal to about 9. In other embodiments, the pH of the reactive solution is maintained above or equal to about 6 and below or equal to about 8.

The pressure sensitive adhesive hydrogels made according to the present disclosure are useful in a variety of applications including use as high moisture vapor transmissive wound or burn dressings, as adhesives used in transdermal drug delivery, as repulpable adhesive hydrogels in, for example, splicing applications in the paper industry, and as conductive adhesive gels in biomedical electrode applications. In this last application, a high degree of pressure sensitive adhesive tack for the hydrogel may not be required when, for instance, a non-conductive, hypoallergenic pressure sensitive adhesive borders the conductive adhesive in the electrode construction.

Pressure sensitive adhesive hydrogels prepared according to the present disclosure possess sufficient cohesive strength to achieve generally more cohesion than adhesiveness in use, allowing for clean removal from skin. However, the adhesive hydrogels may require additional internal integrity or support in some applications such as in hydrophilic contact lenses or membranes required to withstand large pressure differentials. When used as adhesive sheets, it may be desirable to cure them with an embedded support to allow for ease in handling and dimensional stability.

Pressure sensitive adhesives hydrogels made according to the present disclosure can also be used in the delivery of pharmaceuticals to or through mammalian skin, such as in the form of topical or transdermal drug delivery systems. The pharmaceutical or other active ingredient can be compounded with the hydrogel adhesive after polymerization.

The pressure sensitive adhesive hydrogels made according to the present disclosure can also be used in therapeutic mammalian skin coverings, such as dressings, wound closure materials, tapes, and the like. For mammalian skin coverings, biologically active materials can be added to the reactive solution prior to polymerization without deleteriously affecting the biologically active material. Non-limiting examples of such other biologically active materials include broad spectrum antimicrobial agents for the reduction of bacteria levels to minimize infection risk or to treat the effects of infections at the skin or skin openings of a mammalian patient. Broad spectrum antimicrobial agents are disclosed in U.S. Pat. No. 4,310,509, the entire disclosure of which is incorporated herein by reference thereto. Non-limiting examples of other antimicrobial agents include parachlorometaxylenol; triclosan; chlorhexidine and its salts such as chlorhexidine acetate and chlorhexidine gluconate; iodine; iodophors; poly-N-vinyl pyrrolidone-iodophors; silver oxide, silver and its salts, antibiotics (e.g., neomycin, bacitracin, and polymyxin B). Antimicrobial agents can be included in the adhesive hydrogel at concentrations ranging from about 0.01 percent to about 10 percent by weight of the total adhesive hydrogel.

Other biocompatible and/or therapeutic materials can be added to provide suitable pressure sensitive adhesive hydrogels such as compounds to buffer the pH of the final hydrogel adhesive to provide a product having a non-irritating pH suitable for use with sensitive mammalian skin tissue or to otherwise maximize antimicrobial activity. Also, penetration enhancing agents or excipients can be added to the hydrogel adhesive when the pharmaceutical or other active agent for topical or transdermal delivery so requires.

Biomedical electrodes employing pressure sensitive adhesive hydrogel made according to the process of the present disclosure having electrolyte contained therein are useful for diagnostic and therapeutic purposes. In its most basic form, a biomedical electrode comprises a conductive medium contacting mammalian skin and a means for electrical communication interacting between the conductive medium and electrical diagnostic, therapeutic, or electrosurgical equipment.

The pressure sensitive adhesive hydrogels made according to the process of the present disclosure may be included in the various articles mentioned herein by incorporating the hydrogel into the article in a suitable manner. In some embodiments, for example, the polymerized hydrogel may be laminated onto a suitable backing, release liner or other surface and thereafter, if needed, the laminated hydrogel may be cut (e.g., die cut) to an appropriate dimension. In some embodiments, the reactive solution (prior to polymerization) may be placed within the article, or a portion thereof, and thereafter be polymerized in situ so that the polymerization step in the creation of the hydrogel is also a step in the manufacture of the article. Other methods for the incorporation of pressure sensitive adhesive hydrogels into articles such as those described herein will be appreciated by those skilled in the art. Consequently, embodiments of the present disclosure include the step of incorporating the pressure sensitive adhesive hydrogel into an article. The aforementioned step may comprise adding the pressure sensitive adhesive hydrogel to the article or to a portion of the article by, for example, laminating and optionally die cutting the hydrogel thereafter. The aforementioned step may comprise adding the reactive solution to the article or to a portion of the article and thereafter polymerizing the reactive solution in situ to generate the hydrogel. Additionally, the aforementioned step may comprise performing the entire process of manufacturing the pressure sensitive adhesive hydrogel on or within the article or a portion thereof, including polymerizing the reactive solution in situ, to provide an article that comprises the thus manufactured hydrogel.

Figure 2:
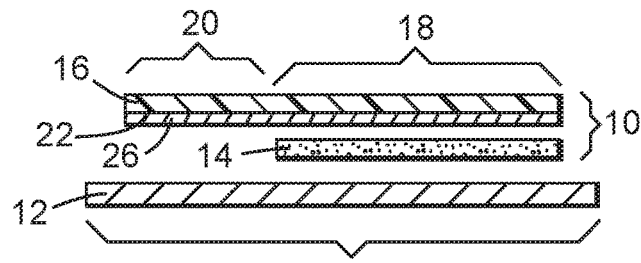
FIG. 2 is an exploded sectional view of the biomedical electrode of FIG. 1.

Referring now to the various Figures, FIGS. 1 and 2 show a biomedical electrode 10 which can be either a disposable diagnostic electrocardiogram (ECG) electrode or a transcutaneous electrical nerve stimulation (TENS) electrode. Electrode 10 is on a release liner 12 and further includes a field 14 of a biocompatible and conductive pressure sensitive adhesive hydrogel. Following polymerization, as describe herein, the pressure sensitive adhesive hydrogel is laminated onto the release liner 12 and then cut, (e.g., die cut) as needed. The field 14 of pressure sensitive adhesive hydrogel is suitable for contacting mammalian skin of a patient upon removal of protective release liner 12. The electrode 10 includes means for electrical communication 16 comprising a conductor member having a conductive interface portion 18 contacting field 14 of pressure sensitive adhesive hydrogel and a tab portion 20 extending beyond the field 14 for mechanical and electrical contact with electrical instrumentation (not shown). Means 16 for electrical communication includes a conductive layer 26 coated on at least the side 22 contacting field 14 of pressure sensitive adhesive hydrogel.

In some embodiments, ECG conductor member 16 will comprise a strip of material such as polyester film having a thickness of about 0.05-0.2 millimeters and have a coating 26 on side 22 of silver/silver chloride of about 2.5-12 micrometers, and typically about 5 micrometers thick thereon. Suitable polyester film includes that which is commercially available under the trade designation "MELINEX" 505-300, 329, or 339 film from ICI Americas of Hopewell, Va. coated with a silver/silver chloride ink commercially available under the trade designation "R-300" ink from Ercon, Inc. of Waltham, Ma. In some embodiments, a TENS conductor member 16 can be made of a nonwoven web, 20. Suitable materials for the web 20 include polyester/cellulose fibers such as those commercially available under the trade designation "MANNIWEB" web from Lydall, Inc. of Troy, N.Y. with a carbon ink layer 26 commercially available under the trade designation "SS24363" ink from Acheson Colloids Company of Port Huron, Mich. on side 22 thereof.

Non-limiting examples of biomedical electrodes which can use hydrophilic, pressure sensitive adhesive hydrogels made according to the present disclosure as conductive adhesive fields include electrodes as are disclosed in U.S. Pat. Nos. 4,527,087; 4,539,996; 4,554,924; 4,848,353 (all Engel); U.S. Pat. No. 4,846,185 (Carim); U.S. Pat. No. 4,771,713 (Roberts); U.S. Pat. No. 4,715,382 (Strand); U.S. Pat. No. 5,012,810 (Strand et al.); U.S. Pat. No. 5,133,356 (Bryan et al.) and U.S. Pat. No. 5,215,087 (Anderson et al.), the entire disclosures of which are incorporated herein by reference thereto.

Because the pressure sensitive adhesive hydrogels made according to the present disclosure can also be characterized as gels having pressure sensitive adhesive properties, the adhesives can also be used as the gelled contact in a conventional gel electrolyte biomedical electrode having a snap-eyelet means of electrical communication. A description of such biomedical electrodes may be found in U.S. Pat. No. 3,805,769 (Sessions); U.S. Pat. No. 3,845,757 (Weyer); and U.S. Pat. No. 4,640,289 (Craighead), the entire disclosures of which are incorporated herein by reference thereto. Non-limiting examples of such biomedical electrodes are those marketed by a number of companies (including 3M Company under the brand "RED DOT"), including those snap-type monitoring electrodes typified by the exploded view of an electrode 50 shown in FIG. 5.

Figure 5:
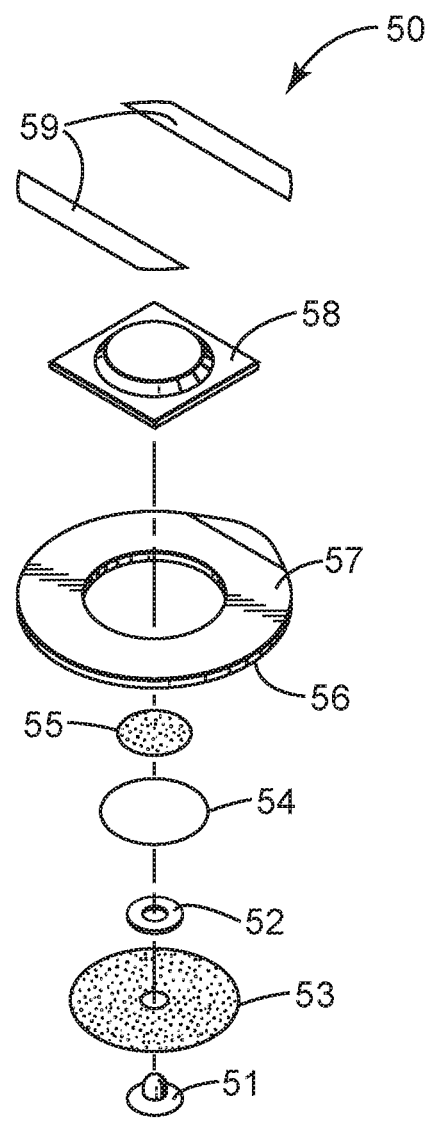
FIG. 5 is an exploded view of a biomedical electrode using the hydrophilic, pressure sensitive adhesive of the present disclosure.

Referring to FIG. 5, a metallic stud 51, (such as stainless steel eyelet No. 304 commercially available from companies such as Eyelets for Industry of Thomaston, Conn.) joins a plastic, metallic plated eyelet 52 (such as an ABS plastic eyelet silver-plated and chlorided commercially available from Micron Products of Fitchburg, Mass.) through an aperture in a polymeric backing 53 (such as front label stock of printed white polyethylene commercially available from Prime Graphics of West Chicago, Ill.). The inner surface of the polymeric backing is coated with an adhesive (such as a phenolic-cured smoke crepe natural rubber based adhesive). Contacting the eyelet 52 at the plated surface is a wood pulp scrim 54 (such as an "AIRTEX 399" scrim commercially available from James River Corporation of Green Bay, Wis.), loaded with a quantity 55 of pressure sensitive adhesive hydrogel made according to the present disclosure. Scrim 54 and adhesive hydrogel 55 reside in a cavity of a 0.16 cm thick coated polyethylene foam 56. A suitable means for placing the hydrogel 55 within the cavity includes placing an amount of the reactive solution within the cavity and polymerizing the solution in situ. The polyethylene foam 56 may be coated with either 12 grains of a 91:9 isooctyl acrylate:N-vinyl-2-pyrrolidone copolymer pressure sensitive adhesive or 18 grains of a 94:6 isooctyl acrylate: acrylic acid copolymer tackified with a "FORAL" branded colophony acid rosin, such as "FORAL AX" or "FORAL 85" rosins commercially available from Hercules Corporation present in an amount of about 35-40 weight percent of the copolymer solids. The pressure sensitive adhesive is covered by a tabbed antifungal liner 57 (such as 83 pound bleached release paper under the brand "POLYSLIK S-8004" treated with "CALGON TK-100" brand fungicide, both liner and treatment commercially available from H. P. Smith Company of Chicago, Ill.).

Scrim 54 and adhesive 55 are protected by a cap 58, (such as a 0.25 mm "PETG" polyester film commercially available from Weiss Company of Chicago, Ill.) secured in place by dual strips 59 of adhesive tape (such as "3M" brand "TYPE 2185" tape). Biomedical electrodes marketed by a number of companies, and the components used in such electrodes, provide combinations of alternative materials useful as snap-type monitoring biomedical electrodes to incorporate hydrophilic pressure sensitive adhesive hydrogels made according to the present disclosure. Alternatively, such electrodes can be manufactured using equipment described in U.S. Pat. No. 4,640,289 (Craighead).

In some instances, the means for electrical communication can be an electrically conductive tab extending from the periphery of the biomedical electrodes such as that seen in U.S. Pat. No. 4,848,353 or can be a conductor member extending through a slit or seam in an insulating backing member, such as that seen in U.S. Pat. No. 5,012,810. Otherwise, the means for electrical communication can be an eyelet or other snap-type connector such as that disclosed in U.S. Pat. Nos. 4,640,289 and 4,846,185. Further, the means for electrical communication can be a lead wire such as that seen in U.S. Pat. No. 4,771,783. Regardless of the type of means for electrical communication employed, pressure sensitive adhesive hydrogel made according to the present disclosure, containing an electrolyte, can reside as a field of conductive adhesive on a biomedical electrode for diagnostic, therapeutic, or electrosurgical purposes.

Medical skin coverings employing pressure sensitive adhesive hydrogel made according to the present disclosure, optionally having antimicrobial and other biologically active agents contained therein, are useful for the treatment of mammalian skin or mammalian skin openings, preferably against the possibility of infection.

Figure 3:
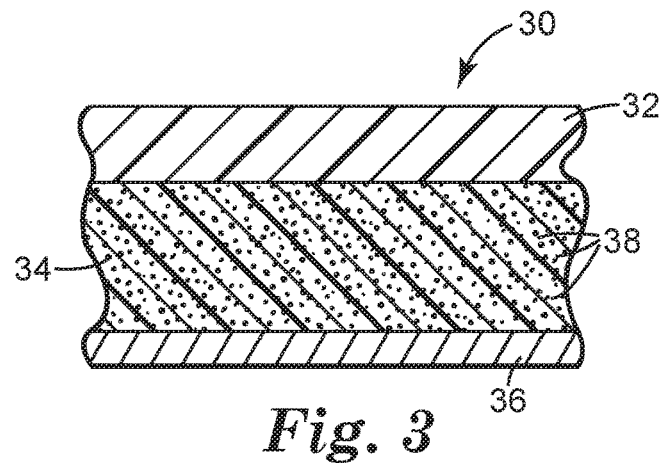
FIG. 3 is a sectional view of a medical mammalian skin covering containing hydrophilic, pressure sensitive adhesive of the present disclosure.

Referring to FIG. 3, a sectional view of a medical skin covering 30 is shown having a backing material 32, a layer 34 of pressure sensitive adhesive hydrogel made according to the present disclosure and positioned on backing material 32. The layer 34 of pressure sensitive adhesive hydrogel is protected until use by a release liner 36. Preferably, antimicrobial 38 is contained in layer 34 by adding agent 38 to the reactive solution prior to the polymerization of the material into a hydrogel. The layer 34 of pressure sensitive adhesive hydrogel may be positioned on the backing material 32 by laminating the hydrogel to the backing and optionally die cutting the hydrogel and/or the backing, as needed. In other embodiments, the hydrogel may be first laminated onto the release liner 36 before the hydrogel is positioned on the backing material 32.

For use, the release liner 36 is removed and the layer 34 of pressure sensitive adhesive hydrogel can be applied to the skin of the patient as a part of a medical tape, a wound dressing, a bandage of general medicinal utility, or other medical device having water moisture absorbing properties.

The adhesive hydrogel layer 34 may be coated on a layer of backing material 32 selected from any of several backing materials having a high moisture vapor transmission rate for use as medical tapes, dressings, bandages, and the like. Suitable backing materials include those disclosed in U.S. Pat. Nos. 3,645,835 and 4,595,001, the disclosures of which are incorporated by reference. Other examples of a variety of films commercially available as extrudable polymers include "HYTREL 4056" and "HYTREL 3548" branded polyester elastomers available from E. I. DuPont de Nemours and Company of Wilmington, Del., "ESTANE" branded polyurethanes available from B. F. Goodrich of Cleveland, Ohio or "Q-THANE" branded polyurethanes available from K. J. Quinn & Co. of Malden, Mass.

The layer 34 of adhesive hydrogel combined with a layer 32 of suitable backing material can be used as a dressing.

Hydrophilic pressure sensitive adhesive hydrogel made according to the present disclosure can be used as discrete gel particles dispersed in a continuous pressure sensitive adhesive matrix to form a two phase composite useful in medical applications, as described in co-pending, co-assigned U.S. Pat. No. 5,270,358, the disclosure of which is incorporated by reference herein.

Methods of lamination and hot lamination generally involve the application of pressure, or heat and pressure, respectively, on the layer 34 of adhesive hydrogel to the backing material layer 32. The temperature for hot lamination ranges from about 50° C. to about 250° C. and the pressures applied to both lamination and hot lamination range from 0.1 Kg/cm$^2$ to about 50 Kg/cm$^2$.

Pharmaceutical delivery devices employing hydrophilic, pressure sensitive adhesives of the present disclosure, optionally having a topical, transdermal, or iontophoretic therapeutic agent and excipients, solvents, or penetration enhancing agents contained therein, are useful for delivery of pharmaceuticals or other active agents to or through mammalian skin.

Figure 4:
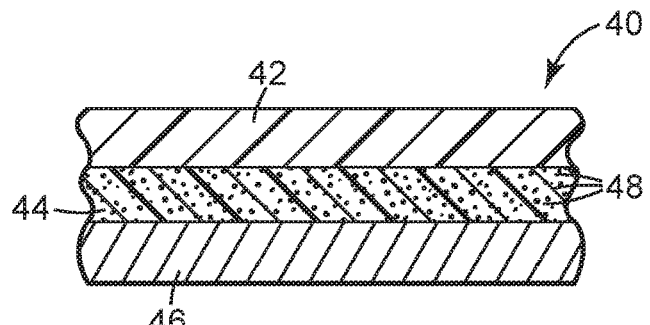
FIG. 4 is a sectional view of a pharmaceutical delivery device containing hydrophilic, pressure sensitive adhesive of the present disclosure.

FIG. 4 shows a sectional view of a transdermal or topical drug delivery device 40 having a backing layer 42, a layer 44 containing pressure sensitive adhesive hydrogel made according to the present disclosure laminated thereon and protected by a release liner 46. Other layers can be present between layer 42 and layer 44 to house pharmaceuticals or other therapeutic agents. Otherwise, as shown in FIG. 4, pharmaceutical and other agents 48 are dispersed in the adhesive hydrogel layer 44.

The backing layer 42 can be any suitable material useful for drug delivery devices. Non-limiting examples of such backing materials are polyethylene, ethylene-vinyl acetate copolymer, polyethylene-aluminum-polyethylene composites, and "SCOTCHPAK" brand backings commercially available from 3M Company of St. Paul, Minn. (3M).

The release liner 46 can be any suitable material known to those skilled in the art. Non-limiting examples of suitable release liners commercially available include siliconized polyethylene terephthalate films commercially available from H. P. Smith Co. and fluoropolymer coated polyester films commercially available from 3M Company as "SCOTCHPAK" brand release liners.

The therapeutic agent 48 can be any therapeutically active material approved for delivery topically to or transdermally or iontophoretically through the skin of a patient. Non-limiting examples of therapeutic agents useful in transdermal delivery devices are any active drug or salts of those drugs, used in topical or transdermal applications, or growth factors for use in enhancing wound healing. Other therapeutic agents identified as drugs or pharmacologically active agents are disclosed in U.S. Pat. Nos. 4,849,224 and 4,855,294, and PCT Patent Publication WO 89/07951.

Excipients or penetration enhancing agents are also known to those skilled in the art. Non-limiting examples of suitable penetration enhancing agents include ethanol, methyl laurate, oleic acid, isopropyl myristate, and glycerol monolaurate. Other penetration enhancing agents known to those skilled in-the art are disclosed in U.S. Pat. Nos. 4,849,224; and 4,855,294 and PCT Patent Publication WO 89/07951.

The drug delivery device 40 shown in FIG. 4 can be prepared using the following general method. A solution is prepared by dissolving the therapeutic agent 48 and such optional excipients as are desired in a suitable solvent and mixed into either plasticizer prior to forming the adhesive, during the formation of the adhesive, or directly into reactive solution described herein. Following polymerization, the resulting loaded adhesive hydrogel is laminated on the backing layer 42. A release liner 46 is applied to cover loaded adhesive layer 44. Die cutting is performed as needed.

Some examples of processes for making pressure sensitive hydrogel adhesives are described in U.S. Pat. No. 7,999,023 (Menon et al.), the entire disclosure of which is incorporated herein by reference thereto.

EXAMPLES

The invention is further illustrated by the following non-limiting examples, in which all parts are by weight unless otherwise stated.

Energy of Adhesion Test Method

A 0.25 inch (6.4 mm) polypropylene probe (STABLE MICRO SYSTEMS TEXTURE ANALYZER, Texture Technologies, Hamilton, Mass.) was used to contact the surface of a hydrogel at a speed of 0.05 mm/sec until reaching a target force of 50 grams. The force was sustained for 10.1 seconds, and then the probe was removed from the hydrogel at a speed of 0.05 mm/sec until the hydrogel debonded entirely from the probe. A plot of Force vs. Time was integrated under the curve associated with the debonding measurement, to provide an area under the curve. The area under the curve was reported as the Energy of Adhesion value (average of n=3), in g*second.

Preparative Example: Method of Making DM-PEG Hydrogel Precursor

In general, polyethylene glycol ("PEG") with a nominal molecular weight of 12000 was endcapped with methacrylate (from methacrylic anhydride) to provide polyethylene glycol dimethacrylate ("DM-PEG") as an oligomeric precursor, using essentially the procedure set forth in U.S. Patent Publication No. 2003/0203011, Preparative Example 1 (MMA-PEG), except that POLYGLYKOL 12000 S (a polyalkylene oxide available from Clariant GmbH, Gendorf, Germany) was used in place of poly(ethylene oxide-co-propylene oxide).

The completion of the reaction was determined by monitoring the unreacted —OH functionality of PEG used in the reaction. The residual —OH groups were derivatized with phenylisocyanate. The derivative was separated by HPLC, using on a size exclusion column (JORDI 100A) and determined by measuring its UV absorption at 230 nm. The analysis showed that the capping reaction was 97% complete. The residual methacrylic anhydride and methacrylic acid levels of the DMPEG were determined by GC to be 122 ppm and 1904 ppm respectively. A residual methacrylic acid level of less than 500 ppm was deemed acceptable.

Comparative Example (CE): No Thiol Added 12.5 grams of DM-PEG hydrogel precursor was dissolved in 45 grams of DI water. To this solution was added 4 grams of potassium chloride (obtained from Aldrich Chemicals of Milwaukee, Wis.), 25.3 grams of polyethylene glycol 300 (obtained from Univar Canada, Ltd., Richland, B.C.), 8.5 grams of glycerin (obtained from IGM Resins Inc., Charlotte, N.C.), 4 grams of ethoxylated trimethylolpropane triacrylate (a crosslinking agent, obtained from IGM Resins Inc., Charlotte, N.C., under the brand PHOTOMER 4158), and 0.2 grams of 2-hydroxy-1-[4-(hydroxyethoxy)phenyl]-2-methyl-1-propanone (obtained from IGM Resins Inc., Charlotte, N.C., under the brand name OMNIRAD 2959). The pH of the reactive solution was adjusted to 6.5 using a combination of monobasic and dibasic phosphate (obtained from Sigma-Aldrich Corporation of St. Louis, Mo.). The reactive solution was UV cured in polyethylene foam wells that were 1.5 mm (60 mils) deep using a FUSION 300 system (Fusion UV Inc., Redondo Beach, Calif.) equipped with a 118 W/cm (300 W/inch) H bulb. The total energy was maintained at 550 mJ/cm$^2$.

Example 1A (EX-1A): 2-Mercaptoethanol at 500 ppm 12.5 grams of DM-PEG hydrogel precursor was dissolved in 45 grams of DI water. To this solution was added 4 grams of potassium chloride (obtained from Aldrich Chemicals of Milwaukee, Wis.), 25.3 grams of polyethylene glycol 300 (obtained from Univar Canada, Ltd., Richland, B.C.), 8.5 grams of glycerin (obtained from IGM Resins Inc., Charlotte, N.C.), 4 grams of ethoxylated trimethylolpropane triacrylate (a crosslinking agent, obtained from IGM Resins Inc., Charlotte, N.C., under the brand PHOTOMER 4158), 2-mercaptoethanol (added neat at 500 ppm relative to the total mixture), and 0.2 grams of 2-hydroxy-1-[4-(hydroxyethoxy)phenyl]-2-methyl-1-propanone (obtained from IGM Resins Inc., Charlotte, N.C., under the brand name OMNI-RAD 2959). The pH of the reactive solution was adjusted to 6.5 using a combination of monobasic and dibasic phosphate (obtained from Sigma-Aldrich Corporation of St. Louis, Mo.). The reactive solution was UV cured in polyethylene foam wells that were 1.5 mm (60 mils) deep using a FUSION 300 system (Fusion UV Inc., Redondo Beach, Calif.) equipped with a 118 W/cm (300 W/inch) H bulb. The total energy was maintained at 550 mJ/cm$^2$.

Examples 1B (EX-1B): 2-Mercaptoethanol at 2000 ppm

The method of EX-1A was repeated, except that the 2-mercaptoethanol was added at 2000 ppm relative to the total mixture.

Examples 1C (EX-1C): 2-Mercaptoethanol at 5000 ppm

The method of EX-1A was repeated, except that the 2-mercaptoethanol was added at 5000 ppm relative to the total mixture.

Example 2A (EX-2A): Cysteine Hydrochloride at 500 ppm

The method of EX-1A was repeated, except that the thiol additive was cysteine hydrochloride, in place of 2-mercaptoethanol. The cysteine hydrochloride was added at 500 ppm relative to the total mixture.

Example 2B (EX-2B): Cysteine Hydrochloride at 2000 ppm

The method of EX-2A was repeated, except that the cysteine hydrochloride was added at 2000 ppm relative to the total mixture.

Example 2C (EX-2C): Cysteine Hydrochloride at 5000 ppm

The method of EX-2A was repeated, except that the cysteine hydrochloride was added at 5000 ppm relative to the total mixture.

Example 3A (EX-3A): Isooctyl Thioglycloate ("IOTG") at 500 ppm

The method of EX-1A was repeated, except that the thiol additive was IOTG, in place of 2-mercaptoethanol. The IOTG was added at 500 ppm relative to the total mixture.

Example 3B (EX-3B): IOTG at 2000 ppm

The method of EX-3A was repeated, except that the IOTG was added at 2000 ppm relative to the total mixture.

Example 3C (EX-3C): IOTG at 5000 ppm

The method of EX-3A was repeated, except that the IOTG was added at 5000 ppm relative to the total mixture.

Samples of each of the cured hydrogels were aged in airtight packaging for seven days, and then were tested for the Energy of Adhesion. Test results were as listed in Table 1.

TABLE 1

| Example | Thiol | Amount of Thiol (ppm) | Energy of Adhesion (g* seconds) |
|---|---|---|---|
| CE | None | 0 | 15.9 |
| EX-1A | 2-Mercaptoethanol | 500 | 13.7 |
| EX-1B | 2-Mercaptoethanol | 2000 | 15.7 |
| EX-1C | 2-Mercaptoethanol | 5000 | 43.1 |
| EX-2A | Cysteine hydrochloride | 500 | 23.5 |
| EX-2B | Cysteine hydrochloride | 2000 | 18.7 |
| EX-2C | Cysteine hydrochloride | 5000 | 42.1 |
| EX-3A | Isooctyl thioglycolate | 500 | 13.2 |
| EX-3B | Isooctyl thioglycolate | 2000 | 16.8 |
| EX-3C | Isooctyl thioglycolate | 5000 | 28.4 |

While embodiments of the invention have been described, it will be appreciated that changes and modifications may be made to the various features of the embodiments described herein without departing from the spirit and scope of the invention.

What is claimed:

1. A process for preparing a pressure sensitive adhesive hydrogel, the process comprising:
   (A) providing an oligomeric precursor, the oligomeric precursor comprising a polyether dimethacrylate, the oligomeric precursor being associated with methacrylic acid;
   (B) providing an ethylenically unsaturated crosslinking agent selected from the group consisting of difunctional ethylenically unsaturated monomer, trifunctional ethylenically unsaturated monomer and combinations of the foregoing;
   (C) optionally providing one or more copolymerizable vinyl monomers, wherein when present, the one or more copolymerizable vinyl monomers are present in a total amount of 2 wt % to 15 wt % of the pressure sensitive adhesive hydrogel;
   (D) providing a thiol in an amount of 100 ppm to 10,000 ppm;
   (E) providing a plasticizer, the plasticizer comprising:

  I wherein
   M is hydrogen or C1 through C6 alkyl; and
   m is an integer ranging from about 1 to about 25; and
   (F) free radically curing a mixture of the oligomeric precursor, the ethylenically unsaturated crosslinking agent, and the thiol in water in the presence of the methacrylic acid at a pH between about 3.5 and about 9 to provide the pressure sensitive adhesive hydrogel, wherein the plasticizer is present in a total amount of 20 wt % to 96 wt % based on a weight of the mixture, and wherein the amount of thiol is relative to a total amount of the mixture.

2. The process as defined in claim 1 wherein the polyether moiety is selected from the group consisting of polyethylene glycol, poly[ethylene glycol co-propylene glycol] random copolymer and combinations of the foregoing.

3. The process as defined in claim 2 wherein ethylenic unsaturation is provided by reacting the polyether moiety with methacrylic anhydride.

4. The process as defined in claim 1 wherein providing an oligomeric precursor in step (A) comprises reacting polyether and methacrylic anhydride; and further comprising dissolving the oligomeric precursor in water to provide a oligomeric precursor solution, wherein the oligomeric precursor comprises polyethylene glycol dimethacrylate.

5. The process as defined in claim 4 wherein the methacrylic acid is present in the reactive solution at a concentration in a range from about 100 ppm to about 500 ppm.

6. The process as defined in claim 1 wherein the oligomeric precursor has a weight average molecular weight of at least about 6000.

7. The process as defined in claim 1 wherein step (B) of providing an ethylenically unsaturated crosslinking agent comprises selecting the ethylenically unsaturated crosslinking agent from the group consisting of polyethylene glycol di(meth)acrylate, methylene bis (meth) acrylamide, ethoxylated bisphenol A di(meth)acrylate, alkanediol di (meth) acrylate, ethoxylated trimethylolpropane triacrylate, trimethylol propane tri(meth)acrylate, ethoxylated glyceryl tri (meth)acrylate, propoxylated glyceryltri(meth)acrylate, and combinations of two or more of the foregoing.

8. The process as defined in claim 1 wherein free radically curing the mixture of the oligomeric precursor, the ethylenically unsaturated crosslinking agent, and the thiol in step (F) is performed in the presence of a peroxide scavenger.

9. The process as defined in claim 1 wherein free radically curing the mixture of the oligomeric precursor, the ethylenically unsaturated crosslinking agent, and the thiol in step (F) comprises adding an initiator and exposing the mixture of the oligomeric precursor, the thiol, and crosslinking agent in water to a radiation selected from the group consisting of ultraviolet radiation, actinic radiation, or a combination thereof, to initiate a polymerization reaction and provide the pressure sensitive adhesive hydrogel.

10. The process as defined in claim 1 wherein free radically curing the mixture of the oligomeric precursor, the ethylenically unsaturated crosslinking agent, and the thiol in step (F) comprises adding an initiator material to initiate an oxidation/reduction reaction to initiate a polymerization reaction and provide the pressure sensitive adhesive hydrogel.

11. The process as defined in claim 1 wherein free radically curing the mixture of the oligomeric precursor, the ethylenically unsaturated crosslinking agent, and the thiol in step (F) comprises dissolving the oligomeric precursor, the ethylenically unsaturated crosslinking agent, and the thiol in the same volume of water to provide a reactive solution; adding an ultraviolet initiator material to the reactive solution and exposing the reactive solution to ultraviolet radiation to initiate a polymerization reaction and provide the pressure sensitive adhesive hydrogel.

12. The process as defined in claim 1 wherein the plasticizer further comprises glycerin.

13. The process as defined in claim 1 wherein free radically curing the mixture of the oligomeric precursor, the ethylenically unsaturated crosslinking agent, and the thiol in step (F) is performed at a pH between about 5 and about 9.

14. The process as defined in claim 1 further comprising (G) incorporating the pressure sensitive adhesive hydrogel into an article.

15. The process as defined in claim 14 wherein the article is a medical device.

16. The process as defined in claim 15 wherein the pressure sensitive adhesive hydrogel further comprises a salt and the medical device is a biomedical electrode.

17. The process as defined in claim 15 wherein the pressure sensitive adhesive hydrogel further comprises an antimicrobial agent and the medical device is a wound dressing.

18. The process as defined in claim 1 wherein the thiol has a water solubility of at least 4 mg/L.

19. The process as defined in claim 1 wherein the thiol is selected from the group consisting of allyl thioglycolate, ethyl thioglycolate, cysteine, 2-mercaptoethanol, 1,3-mercaptopropanol, 3-mercaptopropane-1,2-diol, 1,4-mercaptobutanol, 2-mercaptopropionic acid, mercaptosuccinic acid, thioglycerol, thioacetic acid, isooctyl thioglycolate, and combinations thereof.

20. A pressure sensitive adhesive hydrogel, comprising:
a free radical reaction product of a mixture in water in the presence of methacrylic acid at a pH between about 3.5 and about 9, the mixture comprising:
(A) an oligomeric precursor comprising a polyether dimethacrylate, the oligomeric precursor being associated with the methacrylic acid;
(B) an ethylenically unsaturated crosslinking agent selected from the group consisting of difunctional ethylenically unsaturated monomer, trifunctional ethylenically unsaturated monomer and combinations of the foregoing;
(C) one or more copolymerizable vinyl monomers, wherein when present, the one or more copolymerizable vinyl monomers are present in a total amount of 2 wt % to 15 wt % of the pressure sensitive adhesive hydrogel;
(D) a thiol in an amount of 100 ppm to 10,000 ppm; and
(E) a plasticizer comprising:

$$MO(CH_2CH_2O)_mH \qquad \qquad I$$

wherein
M is hydrogen or C1 through C6 alkyl; and
m is an integer ranging from about 1 to about 25,
wherein the plasticizer is present in a total amount of 20 wt % to 96 wt % based on a weight of the mixture, and wherein the amount of thiol is relative to a total amount of the mixture.

* * * * *